US012770288B2

(12) United States Patent
Hehn et al.

(10) Patent No.: US 12,770,288 B2
(45) Date of Patent: Oct. 20, 2026

(54) IMPROVING FEATURE EXTRACTION USING MOTION BLUR

(71) Applicant: Verity AG, Zürich (CH)

(72) Inventors: Markus Hehn, Zürich (CH); Luciano Beffa, Zürich (CH)

(73) Assignee: Verity AG, Zurich (CH)

( * ) Notice: Subject to any disclaimer, the term of this patent is extended or adjusted under 35 U.S.C. 154(b) by 441 days.

(21) Appl. No.: 18/270,444

(22) PCT Filed: Dec. 13, 2021

(86) PCT No.: PCT/IB2021/061641
§ 371 (c)(1),
(2) Date: Jun. 29, 2023

(87) PCT Pub. No.: WO2022/144656
PCT Pub. Date: Jul. 7, 2022

(65) Prior Publication Data

US 2024/0062412 A1 Feb. 22, 2024

Related U.S. Application Data

(60) Provisional application No. 63/132,244, filed on Dec. 30, 2020.

(51) Int. Cl.

| | |
|---|---|
| ***G06T 7/73*** | (2017.01) |
| ***G06T 5/20*** | (2006.01) |
| ***G06T 5/70*** | (2024.01) |
| ***G06T 7/00*** | (2017.01) |
| ***G06T 7/246*** | (2017.01) |

(52) U.S. Cl.
CPC .................. *G06T 7/73* (2017.01); *G06T 5/20* (2013.01); *G06T 5/70* (2024.01); *G06T 7/0002* (2013.01); *G06T 7/246* (2017.01); *G06T 2207/20081* (2013.01); *G06T 2207/20084* (2013.01); *G06T 2207/30168* (2013.01); *G06T 2207/30244* (2013.01)

(58) Field of Classification Search
CPC .. G06T 7/73; G06T 7/246; G06T 5/70; G06T 5/20; G06T 7/0002; G06T 2207/20081; G06T 2207/20084; G06T 2207/30168; G06T 2207/30244
USPC .......................................................... 382/103
See application file for complete search history.

(56) References Cited

U.S. PATENT DOCUMENTS

2020/0211221 A1* 7/2020 Yano ....................... G06F 18/22

OTHER PUBLICATIONS

Ma, Kede, et al. “Deep blur mapping: Exploiting high-level semantics by deep neural networks.” IEEE Transactions on Image Processing 27.10 (2018): 5155-5166. (Year: 2018).*

(Continued)

*Primary Examiner* — Jonathan S Lee
(74) *Attorney, Agent, or Firm* — BLANK ROME LLP

(57) ABSTRACT

The present invention relates to a method for identifying at least one candidate feature in an image of a scene of interest captured by a camera, and to a method for capturing an image, with spatial variations in image sharpness, of a scene of interest by a camera, and to a method for determining a state $x_k$ of a camera at a time $t_k$, as well as to an assembly and two computer program products.

22 Claims, 2 Drawing Sheets

(56) References Cited

OTHER PUBLICATIONS

International Search Report and Written Opinion for PCT/IB2021/061641, dated Mar. 2, 2022, 11 pages.

P. V. Vu, et al., "A Fast Wavelet-Based Algorithm for Global and Local Image Sharpness Estimation", IEEE Signal Processing Letters, vol. 19, No. 7, Jul. 2012, pp. 423-426.

L. Li, et al., "Blind Realistic Blur Assessment Based on Discrepancy Learning", IEEE Transactions on Circuits and Systems for Video Technology, vol. 20, No. 11, Nov. 2020, pp. 3859-3869.

J. R. G. Braga, et al., "Determining the Trajectory of Unmanned Aerial Vehicles by a Novel Approach for the Particle Filter", Mecánica Computacional, http://venus.santafe-conicei.gov.ar/ojs/index.php/mc/article/view/5568/5546; Nov. 6-9, 2018, vol. 36, pp. 683-692.

T. Nguyen, "Computationally-Efficient Visual Inertial Odometry for Autonomous Vehicle", https://research.library.mun.ca/13900/1/theis.pdf; Jan. 1, 2019, 173 pgs.

S. Bijjahalli, et al., "Advances in Intelligent and Autonomous Navigation Systems for Small UAS", Progress in Aerospace Sciences, vol. 115, 2020, 52 pgs.

* cited by examiner

IMPROVING FEATURE EXTRACTION USING MOTION BLUR

RELATED APPLICATIONS

This application is a national phase of PCT/IB2021/061641, filed on Dec. 13, 2021, which claims priority to U.S. Provisional Application No. 63/132,244, filed on Dec. 30, 2020. The contents of these applications are hereby incorporated by reference in their entirety.

FIELD OF THE INVENTION

The present invention relates to a first method for identifying at least one candidate feature in an image of a scene of interest captured by a camera and to a related computer program product; the present invention further relates to a second method for capturing an image with spatial variations in image sharpness and to a related computer program product; the present invention further relates to an assembly.

BACKGROUND TO THE INVENTION

Indoor navigation of robots, for example drones, is an important problem, e.g., in the field of automatic warehousing. To facilitate indoor navigation, the robot, e.g., the drone, needs to know its current position with respect to its environment. Contrary to outdoor environments in which GNSS (Global Navigation Satellite Systems) can be employed, providing a high localization accuracy, GNSS in indoor environments is often not reliable due to signal attenuation and multi-path effects. Existing RF localization technologies for indoor and outdoor spaces also struggle with signal attenuation and multi-path effects limiting the usability in complex environments, for instance, in the presence of a significant amount of metal.

In the prior art, optical localization systems for indoor localization are known. Such optical localization systems extract information from images captured by a camera. The location of an object of which the pose is to be determined can then be computed using triangulation techniques after relating the coordinates of features in the two-dimensional camera image to three-dimensional rays corresponding to said features. The relation between image coordinates and three-dimensional rays is typically captured in a combination of first-principle camera models (such as pinhole or fisheye camera models) and calibrated distortion models (typically capturing lens characteristics, mounting tolerances, and other deviations from a first-principle model).

In optical localization systems for determining the location of an object known in the prior art, the camera can be rigidly mounted outside the object, observing the motion of the object ("outside-in tracking"), or the camera can be mounted on the object itself observing the apparent motion of the environment ("inside-out tracking"). While outside-in tracking localization systems typically determine the location of the object relative to the known locations of the camera(s), inside-out tracking systems like SLAM (Simultaneous Localization and Mapping) typically generate a map of the environment in which the object moves. The map is expressed in an unknown coordinate system but can be related to a known coordinate system in case the locations of at least parts of the environment are already known or if the initial pose of the camera is known. In both cases, some error will accumulate as the map is expanded away from the initial field of view of the camera or from the parts of the environment with known location. The potential for propagating errors is a problem for applications where the location information must be referred to external information, for example to display the location of the object in a predefined map, to relate it to the location of another such object, or when the location is used to guide the object to a location known in an external coordinate system.

A significant challenge of optical systems is the extraction of information from the camera image for tracking purposes. For outside-in systems, this entails recognizing the object to be tracked in the image. In inside-out systems, it typically entails extracting "good" features and recognizing them in consecutive images, for example using scale-invariant feature transform (SIFT) to detect and annotate features. This is complicated by illuminance routinely varying by many orders of magnitude and the reflectivity of surfaces additionally varying by orders of magnitude. For example, full daylight is about 10,000 lux while full moon is only 0.1 lux. In contrast to this, a single-exposure image taken by an image sensor typically only has 2-3 orders of magnitude of dynamic range (e.g., a 10-bit sensor provides 1024 discrete measurement steps of incident light). This makes it difficult to correctly configure the image sensor sensitivity and exposure time, and additionally makes it difficult to track features relating to a common landmark from image to image, especially in case camera settings change between images. This severely limits the robustness of optical systems in difficult lighting conditions.

In some instances, optical localization systems known in the prior art reduce the impact of varying lighting conditions by 1) adding illuminance to the scene by using torches or strobes; this technique reduces the required dynamic range by increasing the lower limit of the scene illuminance; 2) adding high-contrast landmarks (that is, areas of differing reflectance) to the scene; in the case of outside-in systems this is often combined with strobes in the form of (retro-) reflectors attached to the tracked object; in the case of inside-out systems this often takes the form of high-contrast wall decorations, carpets, etc.; 3) moving out of the visible-light spectrum into the IR or UV spectra; the non-visible-light illuminance can usually be controlled more easily in indoor spaces because there is no need to adjust it to human preferences; this is typically combined with torches or strobes to add a controlled amount of illuminance.

Outside-in optical localization systems typically scale very poorly to larger localization systems because at every point, the object must be seen by several cameras to triangulate the 3D position of the object. Especially for large spaces where only few objects are tracked this is economically not viable. As stated before, for inside-out optical localization systems, a set of "good" features needs to be extracted from an image. It is, however, often the case that, e.g., ambient light sources projected into an image are mistaken as features, ambient light sources, e.g., being shiny and strongly reflecting objects imaged by the camera. Such outlier features may strongly degrade performance of inside-out optical localization systems.

It is an object of the present invention to mitigate at least some of the disadvantages associated with the methods for determining of features in an image of a scene of interest; in particular, to mitigate at least some of the disadvantages associated with the methods for determining of features as used in inside-out optical localization systems.

SUMMARY OF THE INVENTION

According to a first aspect of the present invention, there is provided a method for identifying at least one candidate feature in an image of a scene of interest captured by a camera, involving the steps recited in claim 1. Further features and embodiments of the method according to the first aspect of the present invention are described in the dependent patent claims.

The invention relates to a method for identifying at least one candidate feature in an image of a scene of interest captured by a camera, said at least one candidate feature comprising at least one feature, wherein said scene of interest is in an environment which comprises N landmarks with known positions in a world coordinate system, and wherein the at least one feature corresponds to a projection of at least one landmark of the N landmarks into the image by the camera. The method comprises the following steps: a) receiving said image of the scene of interest, wherein said image comprises spatial variations in image sharpness, wherein a level of image sharpness of a projection appearing in said image is indicative of a likelihood of that projection being a feature or not; b) determining spatial variations in image sharpness of the received image; and c) identifying the at least one candidate feature based on the determined spatial variations in image sharpness.

The environment may be an indoor environment, or it may be an outdoor environment. The term sharpness may refer to a metric defined on the basis of a spatial gradient of pixel intensities of pixels in the image. Local sharpness of an image may be determined in many different ways known from the prior art. Exemplary methods for estimating local sharpness in an image may utilize the wavelet transform (e.g., P. V. Vu and D. M. Chandler, "A Fast Wavelet-Based Algorithm for Global and Local Image Sharpness Estimation," in *IEEE Signal Processing Letters*, vol. 19, no. 7, pp. 423-426, July 2012). A large local sharpness in a part of the image may indicate a large likelihood that the part comprises a feature, and a small local sharpness in a part of the image may indicate a small likelihood of finding a feature in that part of the image. Candidate features may therefore refer to those regions in the image with high local sharpness. Sharpness may be determined on a level of individual pixels of the image, or sharpness may be determined on a level of patches of the image, each patch comprising a plurality of pixels. Instead of sharpness, blurriness may be used, wherein blurriness typically may behave inversely with respect to sharpness (sharp parts of the image may have small blurriness, for example): the received image may therefore have spatial variations in image blurriness, and the likelihood of a part of the image comprising a feature may be related to the blurriness of that part. The level of image sharpness of a projection may be indicative of a likelihood of that projection being a feature for different reasons. For example, if a landmark is embodied as a retroreflector, and if said retroreflector is illuminated, a projection of said retroreflector may appear substantially brighter than a background, causing a boundary of the projection to appear sharp. The level of image sharpness of a projection may also depend on the image acquisition process as further described below. The method according to the first aspect of the present invention may be applied to a single image, i.e., only one received image may be required. The spatial variations in image sharpness of the received image may be determined in the form of a sharpness image.

In an embodiment of the method according to the first aspect of the present invention, the spatial variations in image sharpness of the received image are determined by applying a deep neural network, in particular embodied as convolutional neural network, to the received image, wherein said deep neural network is trained in an end-to-end fashion. The deep neural network may, for example, be embodied as a (dilated) fully convolutional neural network with pooling, the neural network operating on different resolutions (pyramid) of the received image. The deep neural network may be directly applied to the received image and provide a pixel-wise blurriness image corresponding to the received image (having same dimensions as the received image), or it may alternatively provide a pixel-wise sharpness image (having same dimensions as the received image). Alternatively, blurriness/sharpness values may be determined only on the level of patches comprising a plurality of neighboring pixels in the received image. The images used for training the deep neural network may be captured in a real-life environment corresponding to a later use case in which the method according to the first aspect of the present invention is employed. Sharpness images/blurriness images needed for training (together with the corresponding original images) may be obtained using gold-standard sharpness/blurriness evaluation algorithms, and/or sharpness images/blurriness images may be obtained using human annotation. Alternatively, pairs of images and corresponding sharpness image/blurriness image needed for training may be obtained using simulation (simulation may be used to obtain the original images—the corresponding sharpness images/blurriness images may subsequently be determined based on a gold-standard estimation algorithm applied to the simulated original images) in model environments which may be expected to be sufficiently similar to environments in later use cases in which the method according to the first aspect of the present invention is employed.

In a further embodiment of the method according to the first aspect of the present invention, the determining of the spatial variation in image sharpness in the form of a determined sharpness image comprises the following steps: (i) applying an initial filter to the received image, the initial filter being configured to reduce noise and/or to enhance parts of the received image, the filtering providing a filtered received image having same dimensions as the received image; and (ii) determining the sharpness image, the sharpness image having same dimensions as the received image, based on the filtered received image, wherein each sharpness image pixel, each sharpness image pixel having a corresponding filtered received image pixel, of the sharpness image comprises a respective value indicating a magnitude of change in pixel intensities of filtered received image pixels in a neighborhood around the corresponding filtered received image pixel. The initial filtering may also be left out. In this case, the sharpness image may be determined based on the received image directly, and the processing steps for determining the sharpness image based on the received image may be the same as the processing steps for determining the sharpness image based on the filtered received image.

In a further embodiment of the method according to the first aspect of the present invention, the sharpness image is determined based on a combination of a plurality of component sharpness images each having same dimensions as the received image.

Each of the component sharpness images may measure sharpness with respect to a different direction in the filtered received image or in the received image. Each of the component sharpness images may also be obtained using a different sharpness metric/a different sharpness evaluation algorithm. For example, one component sharpness image may be obtained using a deep neural network, while another component sharpness image may be obtained using more classical approaches, e.g., using wavelet analysis. The plurality of component sharpness images may be fused, the fusion providing the sharpness image. Fusing component sharpness image into the (joint) sharpness image may help mitigate weaknesses/shortcomings of individual sharpness evaluation algorithms. Possible fusion methods are, for example, based on scaling, addition, subtraction, element-wise multiplication, expectation, median, pixel-wise minimum or maximum determination of component sharpness images, or any suitable combination thereof.

In a further embodiment of the method according to the first aspect of the present invention, the identifying of the at least one candidate feature comprises the following steps: (i) determining an image mask, the image mask having same dimensions as the received image, based on the determined sharpness image by comparing each sharpness image pixel value to a threshold, and setting the corresponding image mask pixel to '0' if the sharpness image pixel value is smaller than the threshold and to '1' if the sharpness image pixel value is larger than or equal to the threshold; (ii) further determining at least one simple closed curve in the image mask, with pixel elements of the simple closed curve comprising as value '1', and assigning the value '1' to the image mask pixels in the respective interior of the at least one simple closed curve; and (iii) providing, based on the image mask pixels with value '1', the at least one candidate feature.

The threshold may be set during a calibration process. The set threshold may depend on the expected amount of spatial variation in image sharpness of an image in a typical use case scenario. In case the features are very sharp compared to the remaining parts of the image, for example, the threshold may be set higher, and in case the features are only slightly sharper compared to the remaining parts of the image, the threshold may be set lower, for example. Sharpness of features compared to sharpness of remaining parts of the image may be influenced by acquisition modalities (motion of the camera during image capture, time extent of camera exposure time, possibly also optical properties of a lens system of camera, etc.) during image capture by the camera. In case the features are projections of reflectors which differ from one another, the features in the received image may have varying brightness. In this case, the threshold may be set in such a way that a least bright feature can still be detected. Alternatively, the threshold can be set higher to minimize the presence of outliers in the determined candidate features. An image mask pixel with value '1' may therefore correspond to a pixel in the received image/the filtered received image with high local sharpness. As further explained in the description with respect to FIG. 1 below, candidate features may be identified based on local clusters of image mask pixels with assigned value '1', for example.

In a further embodiment of the method according to the first aspect of the present invention, the N landmarks are embodied as reflectors, and the received image is captured by the camera during a camera exposure time temporally extending between a first exposure timepoint $$t_{(1)}^{(Exp)}$$

and a second exposure timepoint $$t_{(2)}^{(Exp)},$$

the first exposure timepoint and the second exposure timepoint forming a camera exposure time interval $$\left[t_{(1)}^{(Exp)}, t_{(2)}^{(Exp)}\right]$$

having temporal extent $$t_{(2)}^{(Exp)} - t_{(1)}^{(Exp)},$$

wherein the camera is moving during the camera exposure time interval along a camera trajectory with a movement velocity, and wherein the temporal extent $$t_{(2)}^{(Exp)} - t_{(1)}^{(Exp)}$$

of the camera exposure time interval with respect to a movement of the camera along the camera trajectory with the movement velocity during the camera exposure time interval is such so as to introduce a specific loss of sharpness in at least parts of the received image, and wherein in the camera exposure time interval a light source is emitting illumination light in a light source emission time interval $$\left[t_{(1)}^{(Emis)}, t_{(2)}^{(Emis)}\right]$$

having shorter temporal extent $$t_{(2)}^{(Emis)} - t_{(1)}^{(Emis)}$$

than the temporal extent of the camera exposure time interval, $$\left[t_{(1)}^{(Emis)}, t_{(2)}^{(Emis)}\right] \subset \left[t_{(1)}^{(Exp)}, t_{(2)}^{(Exp)}\right],$$

wherein illumination light emitted by the light source is reflected by the at least one of the N reflectors corresponding to the captured at least one feature and wherein the reflected illumination light is captured as the at least one feature, and wherein the temporal extent of the light source emission time interval is set in such a way, with respect to the movement of the camera along the camera trajectory with the movement velocity, as to provide sharp features related to the N reflectors in the received image.

The reflectors may be embodied as, in particular substantially similar, retroreflectors, wherein substantial similarity may, e.g., refer to substantially similar reflectivity, and/or substantially similar size, and/or to substantially similar (projected) geometry of the retroreflectors. The reflectors may also differ from one another. The camera trajectory along which the camera moves with a movement velocity may be used for setting the camera exposure time interval and the light source exposure time interval. A fast-moving camera may, for example, require a shorter camera exposure time interval to capture a sufficiently blurry image as compared to a slow-moving camera which may, for example, require a longer camera exposure time interval to capture an image with a comparable amount of blurriness. Besides setting the time extent of the camera exposure time interval based on the camera trajectory and the movement velocity, the first exposure timepoint may also be set based on the camera trajectory and the movement velocity, and/or an analogue first emission timepoint $$t_{(1)}^{(Emis)}$$

at which the light source starts emitting illumination light may also be set based on the camera trajectory and the movement velocity. The camera trajectory and the movement velocity may be pre-given and known, e.g., based on control information controlling movement of a localizing apparatus on which the camera is arranged, or the camera trajectory and the movement velocity may be guessed (e.g., based on a probabilistic model of camera movement or based on 'typical' movement patterns of the camera in the environment).

In a further embodiment of the method according to the first aspect of the present invention, (i) the camera trajectory and the movement velocity of the camera during the camera exposure time interval, (ii) the temporal extent of the camera exposure time interval, and (iii) the temporal extent of the light source emission time interval, are jointly determined, and the camera is moving along the jointly determined camera trajectory with the jointly determined movement velocity during the jointly determined camera exposure time interval, and the light source is emitting illumination light during the jointly determined light source emission time interval.

The camera trajectory and the movement velocity may also be determined jointly with the camera exposure time interval and the light source emission time interval. A camera trajectory and movement velocity may be determined which—together with a jointly determined camera exposure time interval and light source emission time interval—provide a desired amount and type of blurriness/loss of sharpness in the captured image as well as sufficiently sharp features corresponding to projected illuminated reflectors. Movement patterns of the camera capturing images of the environment through which it moves may therefore be deliberately chosen to achieve desired spatial variations in image sharpness in captured images. The camera trajectory and the movement velocity may also be determined based on a pre-set camera exposure time interval and a pre-set light source emission time interval.

According to a second aspect of the present invention, there is provided a first computer program product comprising instructions which when executed by a computer, cause the computer to carry out a method according to the first aspect of the present invention.

According to a third aspect of the present invention, there is provided a method for capturing an image, with spatial variations in image sharpness, of a scene of interest by a camera, wherein the image comprises at least one feature, and wherein said scene of interest is in an environment which comprises N landmarks with known positions in a world coordinate system, wherein the landmarks are configured to reflect illumination light, and wherein the at least one feature corresponds to a projection of at least one illuminated landmark of the N landmarks into the image by the camera, respectively. The method comprises: capturing the image during a camera exposure time interval $$[t_{(1)}^{(Exp)}, t_{(2)}^{(Exp)}],$$

wherein the camera is moving, in particular rotationally and/or translationally, along a camera trajectory with a movement velocity during the camera exposure time interval, wherein a temporal extent $$t_{(2)}^{(Exp)} - t_{(1)}^{(Exp)}$$

of the camera exposure time interval is set in such a way with respect to a movement of the camera along the camera trajectory with the movement velocity during the camera exposure time interval so as to introduce a specific loss of sharpness in at least parts of the captured image, and emitting illumination light during the camera exposure time interval in a light source emission time interval $$[t_{(1)}^{(Emis)}, t_{(2)}^{(Emis)}],$$

with a temporal extent $$t_{(2)}^{(Emis)} - t_{(1)}^{(Emis)}$$

of the light source emission time interval being set with respect to the movement of the camera along the camera trajectory with the movement velocity, said emitted illumination light illuminating the at least one landmark corresponding to the at least one feature and said light source emission time interval being a proper subinterval of the camera exposure time interval, so as to capture an image in which the at least one feature corresponding to the at least one landmark has larger sharpness than a pre-defined sharpness threshold.

Besides the temporal extents $$t_{(2)}^{(Exp)} - t_{(1)}^{(Exp)} \text{ and } t_{(2)}^{(Emis)} - t_{(1)}^{(Emis)},$$

the first exposure timepoint and/or the first emission timepoint may also be set based on the camera trajectory and the movement velocity. The landmarks may be embodied as retroreflectors. The landmarks may also be embodied as simple (diffuse) reflectors. The landmarks may differ from one another. The pre-defined sharpness threshold may, for example, correspond to an average sharpness of the image. The light source may in principle also emit illumination light outside the camera exposure time interval. For the purposes of the present invention, however, only the illumination light emitted during the camera exposure time interval may be relevant. The camera may be equipped with a fixed-focus lens with short hyperfocal distance, ensuring that large parts of the environment may be in focus at a same time. Loss of sharpness/increase of blurriness may therefore primarily be caused by movement of the camera during the camera exposure time interval. The method according to the third aspect of the present invention for capturing an image may therefore provide the following: ambient light and other light sources may appear blurry in the captured image, while reflections of a light source (which may be arranged, together with the camera, on a localizing apparatus) caused by reflectors in the environment may be sharp in the captured image.

In an embodiment of the method according to the third aspect of the present invention, the method further comprises a joint determining of (i) the camera trajectory and the movement velocity of the camera during the camera exposure time interval, (ii) the temporal extent of the camera exposure time interval, and (iii) the temporal extent of the light source emission time interval, wherein the camera is moving along the jointly determined camera trajectory with the jointly determined movement velocity during the jointly determined camera exposure time interval, and wherein the light source is emitting illumination light during the jointly determined light source emission time interval.

The camera trajectory along which the camera moves with the movement velocity during the camera exposure time interval may therefore be actively determined in such a way—together with the camera exposure time interval and the light source time interval—to deliberately induce a desired amount of blurriness in the captured image and to induce sufficiently sharp features corresponding to projected illuminated landmarks in the captured image. In case, e.g., one or, potentially, more of the quantities (i) camera trajectory, (ii) movement velocity, (iii) camera exposure time interval, or (iv) light source emission time interval, or parts thereof (such as first exposure timepoint) are pre-set, the remaining quantities may be determined to achieve a desired amount of blurriness/loss of sharpness in parts of the captured image and sufficiently sharp features.

In a further embodiment of the method according to the third aspect of the present invention, data provided by an inertial measurement unit (IMU), said IMU being in a known geometric relationship to the camera, is used for determining a translational and/or rotational velocity of the camera, and wherein, based on at least said determined translational and/or rotational velocity of the camera and on a known model of the camera, the time extent of the camera exposure time interval and/or the time extent of the light source emission time interval is determined. The camera exposure time interval and/or the light source emission time interval may therefore be set in a dynamic manner depending on a currently observed motion of the camera. The method according to the third aspect of the present invention may therefore be applied to a moving camera without designing a specific movement pattern of the camera at the same time. Said differently, the method according to the third aspect of the present invention may therefore be carried out on a camera with an a priori determined camera movement pattern which is, in particular, determined independently from the method according to the third aspect of the present invention. Alternatively, the camera movement pattern may be determined jointly with the determining of the camera exposure time interval and/or of the light source emission time interval.

In case a current rotational (angular) velocity of the camera is available, for example, and in case the camera is moving only in a rotational manner, i.e., without a translational movement component, motion blur due to rotational motion would be primarily (e.g., for an undistorted equidistant camera, or to first order for a pinhole camera) unaffected by distance of an object point to the camera, wherein distance is measured along rays defined by a camera center of the camera and pixels of an image sensor of the camera. Given knowledge on the lens system used by the camera and size and resolution of the image sensor of the camera (as well as relative placement of the image sensor with respect to the lens system), it may be determined how many pixels in the image sensor would be illuminated by a specific object point in the environment due to rotational motion. The camera exposure time interval may then be set in such a way as to achieve a desired amount of rotational motion blur at a certain angle with respect to the camera axis, for example.

In a further embodiment of the method according to the third aspect of the present invention, a temporal extent of the light source emission time interval $$t_{(2)}^{(Emis)} - t_{(1)}^{(Emis)}$$

is smaller than $$0.5 * \left[t_{(2)}^{(Exp)} - t_{(1)}^{(Exp)}\right],$$

or smaller than $$0.25 * \left[t_{(2)}^{(Exp)} - t_{(1)}^{(Exp)}\right],$$

or smaller than $$0.1 * \left[t_{(2)}^{(Exp)} - t_{(1)}^{(Exp)}\right].$$

According to a fourth aspect of the present invention, there is provided a computer program product comprising instructions which when executed by a computer, cause the computer to carry out a method according to the third aspect of the present invention.

According to a fifth aspect of the present invention, there is provided a method for determining a state $x_k$ of a camera at a time $t_k$, the state $x_k$ being a realization of a state random variable $X_k$, wherein the state is related to a state-space model of a movement of the camera. The method comprises: a) receiving an image of a scene of interest in an environment captured by the camera at the time $t_k$, wherein the environment comprises N landmarks with known positions in a world coordinate system, and wherein the received image is captured according to a method according to the third aspect of the present invention; b) receiving a state estimate $\hat{x}_k$ of the camera at the time $t_k$, wherein the state estimate comprises an estimate of the pose of the camera; c) using the method according to the first aspect of the present invention for determining at least one candidate feature; d) determining positions of M features in the image based on the at least one candidate feature; and e) determining the state $x_k$ of the camera at the time $t_k$ based on (i) the determined positions of M features, (ii) the state estimate $\hat{x}_k$, and (iii) the known positions of the N landmarks, wherein the determining of the state $x_k$ comprises determining an injective mapping estimate from at least a subset of the M features into the set of N landmarks, and wherein the determining of the state $x_k$ is based on an observation model set up based on the determined injective mapping estimate.

The received image in the method according to the fifth aspect of the present invention therefore comprises a spatial variation in image sharpness, wherein features corresponding to illuminated landmarks, e.g., embodied as retroreflectors, have greater sharpness compared to other imaged parts of the scene of interest for which sharpness is lower due to movement of the camera during image acquisition. By applying the method according to the first aspect of the present invention to the received image, at least one candidate feature may be determined. From among the at least one candidate feature, M features and their two-dimensional positions are determined. Having candidate features may therefore help to reduce a possible search space in which features are sought, potentially increasing algorithmic processing speed, and/or it may help to decrease a likelihood of identifying wrong solutions, e.g., falsely classifying an outlier as inlier (i.e., as feature) or vice-versa, and/or it may help to decrease a likelihood of falsely matching a feature to a landmark which it is not a projection of. The M features, potentially comprising outliers, may be matched into the set of the N landmarks, e.g., embodied as substantially identical retroreflectors, by a method as for example described in publication WO 2021/074871. During matching, the state of the camera may be updated as well. The state may be estimated conditional to a—at a specific step of the matching algorithm—current assignment of features to landmarks. The mapping (matching) of (a subset of) the M features (the subset may comprise those of the M features which are not outliers; outliers may be detected and removed during matching) into the set of the N landmarks may typically be injective—M (and therefore the subset) may be smaller than N as not all landmarks may be seen at once by the camera. Linked to a matching may be an observation model, relating the known positions of the landmarks to the (observed) position of the (subset of) the M features; said observation model may be used, as part of an updating/correction step of an (extended) Kalman filter, for determining the state $x_k$ (as well as intermediate estimates of the state of the camera while determining the matching between features and landmarks) of the camera.

The time $t_k$ at which the state $x_k$ of the camera is determined may be in the light source emission time interval, the reason being that for determining the state of the camera, features corresponding to landmarks are used, and said features are captured during the light source emission time interval. The state estimate $\widehat{x_k}$ may therefore relate to an estimate of the pose of the camera in the light source emission time interval, for example at an estimation time-point at the beginning, end, or center of the light source emission time interval.

The camera exposure time interval may be repeated periodically, implying that images of the environment are captured periodically. The relative time of the (also periodically repeating) light source emission time intervals with respect to the periodically repeating camera exposure time intervals may be fixed. A time $t_{k-1}$ may then refer to a previous camera exposure time interval compared to the currently considered camera exposure time interval at the time $t_k$, and a time $t_{k+1}$ may refer to a subsequent camera exposure time interval. The state estimate $\widehat{x_k}$ may be determined based on the previous state $x_{k-1}$ (the previous state may be forwarded in time using a motion model of the camera, for example, as part of a Kalman filter). The previous state may also be an initial guess, which initial guess may be provided as part of an initialization procedure.

The method according to the fifth aspect of the present invention may be provided by a computer program product comprising instructions which when executed by a computer, cause the computer to carry out the method according to the fifth aspect of the present invention. This computer program product may use the computer program products according to the second and fourth aspect of the present invention.

According to a sixth aspect of the present invention, there is provided an assembly, comprising (i) a camera, (ii) a light source, (iii) a plurality of landmarks, and (iv) a controller, wherein the controller is configured to carry out a method according to the third aspect of the present invention and/or a method according to the first aspect of the present invention.

In an embodiment of the assembly according to the invention, the assembly further comprises a localizing apparatus on which the camera and the light source are arranged, and the localizing apparatus is configured to move during the camera exposure time interval.

The localizing apparatus may be embodied, for example, as a drone, or as a general flying device, or as a land-based robot. The camera may be attached to the localizing apparatus in such a way that the motion of the camera with respect to the environment is sufficient to cause parts of the environment which do not correspond to the landmarks, e.g., parts of the environment such as sources of ambient light caused by shiny reflective surfaces made of metal, to appear sufficiently blurry in the captured image. The camera may be rigidly mounted to a frame of a quadcopter or a more general flying device, for example, such that vibration of propellers and/or of motors of the quadcopter are transmitted to the camera, thereby causing additional movement of the camera—besides the underlying movement of the quadcopter—with respect to the environment. In case a more pronounced loss of sharpness/increase of blurriness is required, the camera may also be attached in such a way to the localizing apparatus that motion of the localizing apparatus causes an amplified motion of the camera. The camera may, for example, be mounted far away from a center of rotation of the localizing apparatus to increase the magnitude of motion of the camera with respect to the environment when the localizing apparatus is rotating. The camera may also be mounted on a flexible cantilever attached to the localizing apparatus, and stiffness and length of the cantilever may be chosen in such a way so that vibrations of the camera during movement of the localizing apparatus are amplified. The assembly may also further comprise an actuator. The camera may be attached to the actuator, and the actuator itself may be arranged on the localizing apparatus. The actuator may be configured to actively move the camera. This way, blurrier images of the environment may potentially be captured by the camera as compared to the blurriness of images induced by only passive means such as underlying motion of the localizing apparatus.

In a further embodiment of the assembly according to the invention, the assembly further comprises an inertial measurement unit arranged on the localizing apparatus, wherein the inertial measurement unit is embodied as an accelerometer and/or as a gyroscope.

BRIEF DESCRIPTION OF DRAWINGS

Exemplar embodiments of the invention are disclosed in the description and illustrated by the drawings in which.

DETAILED DESCRIPTION OF DRAWINGS

Figure 1:
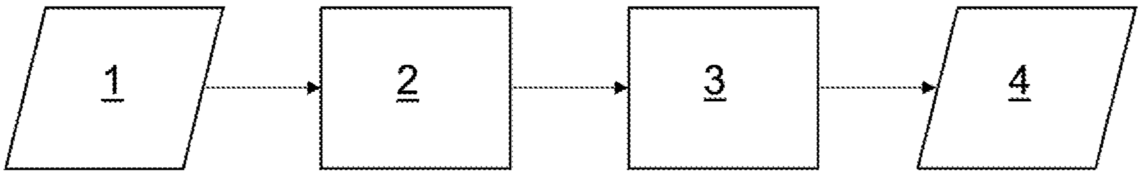
FIG. 1 schematically illustrates the method according to the first aspect of the invention for identifying at least one candidate feature in an image.

FIG. 1 schematically illustrates the method according to the first aspect of the invention for identifying at least one candidate feature in an image.

In a first step, an image 1 is received, wherein said image 1 comprises spatial variations in image sharpness. Different parts of the image 1 are therefore sharper than other parts. Said differently, some parts of the image 1 are blurrier than other parts. Sharpness may be understood to refer to a metric based on a spatial derivative of the image 1. Sharpness respectively blurriness encodes information on a likelihood of presence or absence of a feature in a part of the image 1. Sharper parts/less blurry parts of the image are more likely to comprise a feature than less sharp/blurrier parts. A feature is a projection of a landmark into the image 1 by a camera; positions of landmarks are a priori known in a world coordinate system. The landmarks may be substantially similar to one another. For example, the landmarks may be embodied as substantially similar retroreflectors.

In a next step, spatial variations in image sharpness are determined 2 in the image 1. Spatial variations in image sharpness may be determined on the level of individual pixels of the received image 1, or spatial variations in image sharpness may be determined for patches comprising a plurality of image pixels of the received image 1. As implied before and due to sharpness being related to a spatial derivative operation, a sharpness value assigned to an individual pixel necessarily refers to pixel values of neighboring pixels of the individual pixel.

Spatial variations in image sharpness may be obtained by applying a dedicated deep neural network to the image 1, the deep neural network, e.g., having been trained to determine sharpness on the level of individual pixels. Spatial variations in image sharpness may alternatively be determined in the following way, wherein the spatial variations in image sharpness may be determined in the form of a sharpness image: the received image 1 may first be filtered, e.g., using a band-pass filter, or a thresholding filter or a high-pass filter. A thresholding filter may, for example, be used to remove a noise floor of the image and to remove dark parts of the image which may be less likely to comprise a feature corresponding to a landmark. The image 1 may also be filtered with a Gaussian filter to remove noise from the image. The filtering may provide a filtered received image. Based on the filtered received image, or alternatively on the received image 1 if no (pre-)filtering is carried out, a sharpness image is determined. The sharpness image may have same dimensions as both the received image 1 and the filtered received image and may in particular correspond to a matrix of sharpness values. Each pixel in the sharpness image may therefore have a corresponding pixel in the received image 1/the filtered received image. Each pixel of the sharpness image may be determined based on pixel values of pixels in a neighborhood of the corresponding pixel in the received image 1/the filtered received image. A sharpness value determined for a pixel of the sharpness image may indicate a magnitude of change in the pixel intensities in the neighborhood of the corresponding pixel in the received image 1/the filtered received image. A high sharpness value may indicate the presence of a sharp corner or edge, for example, and a low sharpness value may indicate the presence of a smooth or blurry corner or edge, for example. Sharpness values may be obtained by different means: convolution with a Laplace filter, or with a Sobel filter, or a Roberts or Prewitt filter, or any other suitable filter known from the prior art. The sharpness image may also be determined based on a plurality of component sharpness images: component sharpness images may in particular measure directional sharpness, e.g., determined through directional spatial derivatives, and the sharpness image may be obtained through any suitable combination of the component sharpness images.

In a next step, at least one candidate feature is determined (identified) 3 based on the previously determined 2 spatial variations in image sharpness. Based on the spatial variations in image sharpness, an image mask may be determined. An image mask (the image mask may have same dimensions as the received image 1) may, for example, be determined as follows: each pixel of the sharpness image may be compared to a threshold, and if the respective pixel has a value which is smaller than the threshold, a corresponding pixel value of the image mask may be set to '0', and if the respective pixel has a value which is larger than or equal to the threshold, a corresponding pixel value of the image mask may be set to '1'. '0' and '1' may refer to logical values (Boolean values). The image mask may comprise at least one simple closed curve. The term "simple closed curve" may refer to a two-dimensional curve whose start point and end point coincide and which does not cross itself: as such, a simple closed curve has a well-defined inside and outside. A simple closed curve may be detected using algorithms known from the prior art (e.g., Ming Xie, Monique Thonnat, An algorithm for finding closed curves, Pattern Recognition Letters, Volume 13, Issue 1, 1992, Pages 73-81). A simple closed curve in the image mask may indicate the presence of a feature in the corresponding received image 1. If the feature, e.g., corresponds to a projection of an illuminated retroreflector, the illuminated part of the retroreflector may appear to be much brighter in the image 1 than projected surroundings: the image mask may in this case comprise a simple closed curve separating an inside (the projection of the retroreflector) from an outside (the projected surroundings of the retroreflector). The values of the image mask in the inside of the simple closed curve may be set to '1', thereby indicating a likely presence of a feature in a corresponding region of the received image 1, i.e., a candidate feature. More generally, any cluster of pixels with value '1', cluster for example referring to a presence of at least seven pixels with value '1' in a submatrix of the image mask comprising three-times-three elements (similar counting criteria may be described for larger submatrices of the image mask—after the filling of insides of simple closed curves in the image mask as previously described), may be considered to correspond to a candidate feature—the pixel values in the cluster which are not equal to '1' may be set to '1' if the counting argument indicates a presence of a feature. In case the image mask has same dimensions as the received image 1, coordinates of the candidate features may be determined from the image mask, and said coordinates may be provided as output 4 of the method according to the first aspect of the invention. Alternatively, values in the received image 1/the filtered received image corresponding to the clusters in the image mask may be provided as output 4, together with their relative positions in a coordinate system of an image sensor acquiring the image 1.

Candidate features may also be determined as follows: a feature extraction method, e.g., extracting bright spots in an image, may be applied to the filtered received image or to the received image. For each detected bright spot, a plurality of gradients at the boundary of said bright spot may be determined, the plurality of gradients, e.g., being embodied as gradients in directions orthogonal to the boundary: if it is a unit normal to the boundary at a specific position of the boundary, the gradient in a direction orthogonal to the boundary may, e.g., be computed as follows: $\hat{n}(\hat{n}\cdot\nabla u)$, with $\nabla$ referring to the gradient operation and '·' to the inner product, and u being a scalar field, e.g., corresponding to pixel intensities of the pixels in the received image/filtered received image. A suitable metric may be applied to said plurality of gradients, and an output of the metric may be compared to a threshold, wherein based on the comparison it may be determined if a detected bright spot is sufficiently sharp to likely correspond to a feature (such a detected bright spot may be provided as candidate feature), or if a detected bright spot is too blurry and therefore more likely corresponds to an outlier.

Figure 2:
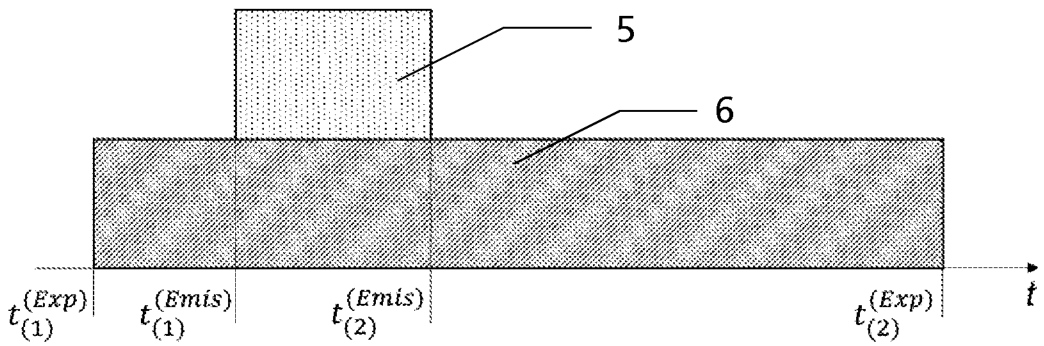
FIG. 2 schematically illustrates a time course of a camera exposure time interval and of a light source emission time interval according to the invention.

FIG. 2 schematically illustrates a time course of a camera exposure time interval and of a light source emission time interval according to the invention. The image 1 may be captured by a camera during a camera exposure time interval 6. The camera exposure time interval 6 may refer to a time during which an image sensor of the camera is exposed to light, e.g., to a time in which a shutter of the camera is open. The camera exposure time interval 6 may also be set using electronic means for starting and stopping exposure of the image sensor to light. In a light source emission time interval 5 in the camera exposure time interval 6, a light source may be configured to emit illumination light. The camera exposure time interval 6 has a temporal extent which may be larger than a temporal extent of the light source emission time interval 5. The light source emission time interval may preferentially be a proper subinterval of the camera exposure time interval 6. The light source may also emit illumination light outside the camera exposure time interval 6. For the purpose of the present invention, such emitted illumination light outside the camera exposure time interval 6 may be disregarded.

During the camera exposure time interval 6, the camera may be moved so as to induce a loss of sharpness/increase of blurriness in the captured image 1. A sharp edge in an environment would—in case of: (i) no movement of the camera during the camera exposure time interval 6, (ii) the sharp edge being stationary, and (iii) the camera having a lens system and an image sensor which can resolve the sharp edge, e.g., measured by a modulation transfer function or a point spread function—be captured in a sharp way as well in the image. Movement of the camera during the camera exposure time intervals may, however, induce blurriness, i.e., the sharp edge may be projected onto more pixels of the image sensor of the camera as compared to the case of no movement of the camera during image acquisition.

A retroreflector may typically only appear brightly in an image 1 while being illuminated. During the light source emission illumination time interval 5, the light source may illuminate a retroreflector, and the retroreflector may appear brightly in the image 1. Depending on a current velocity of the camera capturing the image, different temporal extents of the camera exposure time interval 6 may be needed to induce a desired loss of sharpness in the captured image 1. Furthermore, distance of an imaged object to the camera and field of view of the camera may influence the required temporal extent of the camera exposure time interval 6 so that a desired loss of sharpness is induced in the captured image 1. For a quickly moving camera, for example, a shorter camera exposure time interval 6 may be required to achieve a desired amount of blurriness in the captured image as compared to a slowly moving camera. Similarly, for a projection of a landmark, e.g., embodied as retroreflector, to appear sharp in the image 1, the light source illumination time interval 5 may need to be sufficiently short relative to a type of movement of the camera. If the light source illumination time interval 5 is shorter than the camera exposure time interval 6, projections of a landmark, e.g., embodied as retroreflector, may be sharper than projections of surrounding scenery. Both the camera exposure time interval 6 and the light source emission time interval 5 may be set during a calibration process: these two intervals 5, 6 therefore may be optimized for a particular environment in which the camera may operate with typical movement patterns. Using the method according to the first aspect of the present invention, features corresponding to landmarks may then be extracted and identified in a potentially improved and more robust manner, aiding subsequent localization tasks building on top of the detected features.

Figure 3:
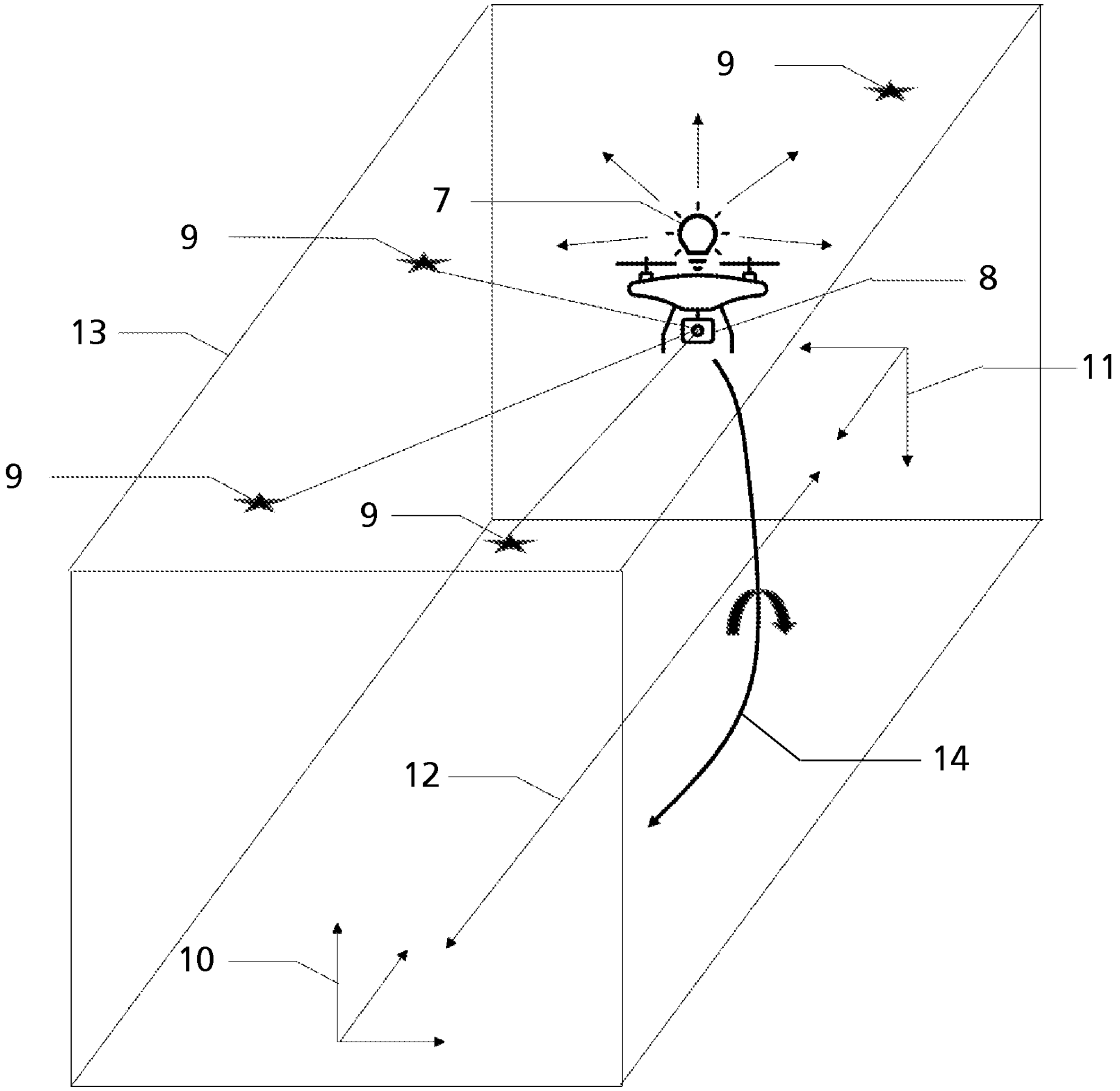
FIG. 3 shows a schematic depiction of a drone comprising a light source and a camera, wherein the drone is configured to fly in an indoor environment, wherein landmarks are arranged at a plurality of positions in said indoor environment.

FIG. 3 shows a schematic depiction of a drone comprising a light source 7 and a camera 8, which drone is flying in an indoor environment 13. Landmarks 9, in particular embodied as substantially similar retroreflectors, are arranged at a plurality of positions in the indoor environment 13, which indoor environment 13 is a scene of interest. The landmarks 9 may be mounted on a ceiling in the scene of interest 13. Instead of being mounted to a ceiling in the scene of interest 13, the landmarks 9 may also be an integral part of the scene of interest 13 and may also be located on walls and/or a floor of the scene of interest 13. At any given pose of the drone, some landmarks 9 may be visible to the camera 8—in FIG. 2 indicated by lines between the landmarks 9 and the camera 8—while other landmarks 9 may not be visible to the camera 8. The positions of the landmarks 9 are known in a world coordinate system 10, and the current location of the drone may be expressed in a drone coordinate system 11, wherein a coordinate transformation 12 may be estimated between the world coordinate system 10 and the drone coordinate system 11. In case the camera 8 and the light source 7 are mounted rigidly to the drone, the pose of the camera 8 and of the light source 7 can be related to the world coordinate system 10 using the drone coordinate system 11. The current position of the drone can be determined using image(s) of the scene of interest 13, specifically of the landmarks 9 having known positions. Alternatively, or in addition, the drone may be equipped with an inertial measurement unit, which inertial measurement unit may be also used for pose determination. The light source 7 may be an isotropically emitting light source, or it may be a directional light source emitting in a non-isotropic manner. Light source 7 and camera 8 are ideally close to each other, specifically in case the landmarks 9 are embodied as retroreflectors. The camera 8 may also be mounted on top of the drone, i.e., next to the light source 7. During image acquisition, the drone may be configured to move along a specific trajectory 14, potentially further involving rotation around the trajectory 14. Such movement may be used to induce a loss of sharpness in the captured image 1 (loss of sharpness may take place with respect to the general indoor environment), while projections of the landmarks 9 into the image 1 may still be sharp due to a short illumination time, the light source emission time interval 5, of illumination light emitted by the light source 7 as compared to the camera exposure time interval 6 during which an image 1 is captured.

The invention claimed is:

1. Method for identifying at least one candidate feature in an image of a scene of interest captured by a camera, said at least one candidate feature comprising at least one feature, wherein said scene of interest is in an environment which comprises N landmarks with known positions in a world coordinate system, and wherein the at least one feature corresponds to a projection of at least one landmark of the N landmarks into the image by the camera, the method comprising the following steps:

a) receiving said image of the scene of interest, wherein said image comprises spatial variations in image sharpness, wherein a level of image sharpness of a projection appearing in said image is indicative of a likelihood of that projection being a feature or not;

b) determining spatial variations in image sharpness of the received image, wherein determining the spatial variations comprises generating a pixel-wise sharpness image, wherein each pixel of the sharpness image represents a local sharpness value of one or more pixels of the received image; and c) identifying the at least one candidate feature based on the determined spatial variations in image sharpness;

wherein the determining of the spatial variation in image sharpness in the form of a determined sharpness image comprises the following steps:

(i) applying an initial filter to the received image, the initial filter being configured to reduce noise and/or to enhance parts of the received image, the filtering providing a filtered received image; and (ii) determining the sharpness image based on the filtered received image, wherein each sharpness image pixel comprises a respective value indicating a magnitude of change in pixel intensities of filtered received image pixels in a neighborhood around one or more filtered received image pixels associated with the respective sharpness image pixel.

2. Method according to claim 1, wherein the spatial variations in image sharpness of the received image are determined by applying a deep neural network, in particular embodied as convolutional neural network, to the received image, wherein said deep neural network is trained in an end-to-end fashion.

3. Method according to claim 1, wherein the filtered received image has the same dimensions as the received image; and wherein the sharpness image has the same dimensions as the received image.

4. Method according to claim 1, wherein the sharpness image is determined based on a combination of a plurality of component sharpness images.

5. Method according to claim 4, wherein the plurality of component sharpness images each have the same dimensions as the received image.

6. Method according to claim 1, wherein the identifying of the at least one candidate feature comprises the following steps:

(i) determining an image mask, based on the determined sharpness image by comparing each sharpness image pixel value to a threshold, and setting the corresponding image mask pixel to '0' if the sharpness image pixel value is smaller than the threshold and to '1' if the sharpness image pixel value is larger than or equal to the threshold;

(ii) further determining at least one simple closed curve in the image mask, with pixel elements of the simple closed curve comprising as value '1', and assigning the value 'l' to the image mask pixels in the respective interior of the at least one simple closed curve; and (iii) providing, based on the image mask pixels with value '1', the at least one candidate feature.

7. Method according to claim 1, wherein the N landmarks are embodied as reflectors, and wherein the received image is captured by the camera during a camera exposure time temporally extending between a first exposure timepoint $$t_{(1)}^{(Exp)}$$

and a second exposure timepoint $$t_{(2)}^{(Exp)},$$

the first exposure timepoint and the second exposure timepoint forming a camera exposure time interval $$\left[t_{(1)}^{(Exp)}, t_{(2)}^{(Exp)}\right]$$

having temporal extent $$t_{(2)}^{(Exp)} - t_{(1)}^{(Exp)},$$

wherein the camera is moving during the camera exposure time interval along a camera trajectory with a movement velocity, and wherein the temporal extent $$t_{(2)}^{(Exp)} - t_{(1)}^{(Exp)}$$

of the camera exposure time interval with respect to a movement of the camera along the camera trajectory with the movement velocity during the camera exposure time interval is such so as to introduce a specific loss of sharpness in at least parts of the received image, and wherein in the camera exposure time interval a light source is emitting illumination light in a light source emission time interval $$\left[t_{(1)}^{(Emis)}, t_{(2)}^{(Emis)}\right]$$

having shorter temporal extent $$t_{(2)}^{(Emis)} - t_{(1)}^{(Emis)}$$

than the temporal extent of the camera exposure time interval, $$\left[t_{(1)}^{(Emis)}, t_{(2)}^{(Emis)}\right] \subset \left[t_{(1)}^{(Exp)}, t_{(2)}^{(Exp)}\right],$$

wherein illumination light emitted by the light source is reflected by the at least one of the N reflectors corresponding to the captured at least one feature and wherein the reflected illumination light is captured as the at least one feature, and wherein the temporal extent of the light source emission time interval is set in such a way, with respect to the movement of the camera along the camera trajectory with the movement velocity, as to provide sharp features related to the N reflectors in the received image.

8. Method according to claim 7, wherein (i) the camera trajectory and the movement velocity of the camera during the camera exposure time interval, (ii) the temporal extent of the camera exposure time interval, and (iii) the temporal extent of the light source emission time interval are jointly determined, and wherein the camera is moving along the jointly determined camera trajectory with the jointly determined movement velocity during the jointly determined camera exposure time interval, and wherein the light source is emitting illumination light during the jointly determined light source emission time interval.

9. Computer program product comprising instructions which when executed by a computer, cause the computer to carry out a method according to claim 1.

10. Method for determining a state $x_k$ of a camera at a time $t_k$, the state $x_k$ being a realization of a state random variable $X_k$, wherein the state is related to a state-space model of a movement of the camera, the method comprising:

a) receiving an image of a scene of interest in an environment captured by the camera at the time $t_k$, wherein the environment comprises N landmarks with known positions in a world coordinate system, and wherein the received image is captured according to a method according to claim 9;

b) receiving a state estimate $\widehat{x_k}$ of the camera at the time $t_k$, wherein the state estimate comprises an estimate of the pose of the camera;

c) using the method according to claim 1 for determining at least one candidate feature;

d) determining positions of M features in the image based on the at least one candidate feature; and e) determining the state xx of the camera at the time $t_k$ based on (i) the determined positions of M features, (ii) the state estimate $\widehat{x_k}$, and (iii) the known positions of the N landmarks, wherein the determining of the state $x_k$ comprises determining an injective mapping estimate from at least a subset of the M features into the set of N landmarks, and wherein the determining of the state $x_k$ is based on an observation model set up based on the determined injective mapping estimate.

11. Assembly, comprising (i) a camera, (ii) a light source, (iii) a plurality of landmarks, and (iv) a controller, wherein the controller is configured to carry out a method according to claim 1.

12. Method for capturing an image, with spatial variations in image sharpness, of a scene of interest by a camera, wherein the image comprises at least one feature, and wherein said scene of interest is in an environment which comprises N landmarks with known positions in a world coordinate system, wherein the landmarks are configured to reflect illumination light, and wherein the at least one feature corresponds to a projection of at least one illuminated landmark of the N landmarks into the image by the camera, respectively, the method comprising: capturing the image during a camera exposure time interval $$[t_{(1)}^{(Exp)}, t_{(2)}^{(Exp)}],$$

wherein the camera is moving along a camera trajectory with a movement velocity during the camera exposure time interval, wherein a temporal extent $$t_{(2)}^{(Exp)} - t_{(1)}^{(Exp)}$$

of the camera exposure time interval is set in such a way with respect to a movement of the camera along the camera trajectory with the movement velocity during the camera exposure time interval so as to introduce a specific loss of sharpness in at least parts of the captured image, and emitting illumination light during the camera exposure time interval in a light source emission time interval $$[t_{(1)}^{(Emis)}, t_{(2)}^{(Emis)}],$$

with a temporal extent $$t_{(2)}^{(Emis)} - t_{(1)}^{(Emis)}$$

of the light source emission time interval being set with respect to the movement of the camera along the camera trajectory with the movement velocity, said emitted illumination light illuminating the at least one landmark corresponding to the at least one feature and said light source emission time interval being a proper subinterval of the camera exposure time interval, so as to capture an image in which the at least one feature corresponding to the at least one landmark has larger sharpness than a pre-defined sharpness threshold.

13. Method according to claim 12, further comprising a joint determining of (i) the camera trajectory and the movement velocity of the camera during the camera exposure time interval, (ii) the temporal extent of the camera exposure time interval, and (iii) the temporal extent of the light source emission time interval, wherein the camera is moving along the jointly determined camera trajectory with the jointly determined movement velocity during the jointly determined camera exposure time interval, and wherein the light source is emitting illumination light during the jointly determined light source emission time interval.

14. Method according to claim 12, wherein data provided by an inertial measurement unit (IMU), said IMU being in a known geometric relationship to the camera, is used for determining a translational and/or rotational velocity of the camera, and wherein, based on at least said determined translational and/or rotational velocity of the camera and on a known model of the camera, the time extent of the camera exposure time interval and the time extent of the light source emission time interval is determined.

15. Method according to claim 12, wherein a temporal extent of the light source emission time interval $$t_{(2)}^{(Emis)} - t_{(1)}^{(Emis)}$$

is smaller than $$0.5 * [t_{(2)}^{(Exp)} - t_{(1)}^{(Exp)}],$$

or smaller than $$0.25*[t_{(2)}^{(Exp)}-t_{(1)}^{(Exp)}],$$

or smaller than $$0.1*[t_{(2)}^{(Exp)}-t_{(1)}^{(Exp)}].$$

16. Computer program product comprising instructions which when executed by a computer, cause the computer to carry out a method according to claim 12.

17. Assembly, comprising (i) a camera, (ii) a light source, (iii) a plurality of landmarks, and (iv) a controller, wherein the controller is configured to carry out a method according to claim 12.

18. Assembly according to claim 17, further comprising a localizing apparatus on which the camera and the light source are arranged, and wherein the localizing apparatus is configured to move during the camera exposure time interval.

19. Assembly according to claim 18, further comprising an inertial measurement unit arranged on the localizing apparatus, wherein the inertial measurement unit is embodied as an accelerometer and/or as a gyroscope.

20. Method for identifying at least one candidate feature in an image of a scene of interest captured by a camera, said at least one candidate feature comprising at least one feature, wherein said scene of interest is in an environment which comprises N landmarks with known positions in a world coordinate system, and wherein the at least one feature corresponds to a projection of at least one landmark of the N landmarks into the image by the camera, the method comprising the following steps:

a) receiving said image of the scene of interest, wherein said image comprises spatial variations in image sharpness, wherein a level of image sharpness of a projection appearing in said image is indicative of a likelihood of that projection being a feature or not;

b) determining spatial variations in image sharpness of the received image; and c) identifying the at least one candidate feature based on the determined spatial variations in image sharpness;

wherein the step b) of determining the spatial variation in image sharpness comprises the following steps:

(i) applying an initial filter to the received image, the initial filter being configured to reduce noise and/or to enhance parts of the received image, the filtering providing a filtered received image; and (ii) determining the sharpness image, based on the filtered received image, wherein each sharpness image pixel, each sharpness image pixel having a corresponding filtered received image pixel, of the sharpness image comprises a respective value indicating a magnitude of change in pixel intensities of filtered received image pixels in a neighborhood around the corresponding filtered received image pixel.

21. Method for identifying at least one candidate feature in an image of a scene of interest captured by a camera, said at least one candidate feature comprising at least one feature, wherein said scene of interest is in an environment which comprises N landmarks with known positions in a world coordinate system, and wherein the at least one feature corresponds to a projection of at least one landmark of the N landmarks into the image by the camera, the method comprising the following steps:

a) receiving said image of the scene of interest, wherein said image comprises spatial variations in image sharpness, wherein a level of image sharpness of a projection appearing in said image is indicative of a likelihood of that projection being a feature or not;

b) determining spatial variations in image sharpness of the received image, wherein determining the spatial variations comprises generating a pixel-wise sharpness image, wherein each pixel of the sharpness image represents a local sharpness value of one or more pixels of the received image, wherein the sharpness image is determined based on a combination of a plurality of component sharpness images; and c) identifying the at least one candidate feature based on the determined spatial variations in image sharpness.

22. Method according to claim 21, wherein the plurality of component sharpness images each have the same dimensions as the received image.

* * * * *